OR 4,054,356

United States Patent [19]
Noguchi

[11] 4,054,356
[45] Oct. 18, 1977

[54] METHOD OF MAKING HOLOGRAM LENSES

[75] Inventor: Masaru Noguchi, Asaka, Japan

[73] Assignee: Fuji Photo Film Co., Ltd., Minamiashigara, Japan

[21] Appl. No.: 622,855

[22] Filed: Oct. 16, 1975

[30] Foreign Application Priority Data

Oct. 18, 1974  Japan .................. 49-120479

[51] Int. Cl.² ............... G02B 5/32; G03H 1/04
[52] U.S. Cl. ................... 350/3.5; 350/162 ZP
[58] Field of Search .......... 350/3.5, 162 ZP, 162 R

[56] References Cited

U.S. PATENT DOCUMENTS

| 3,578,845 | 5/1971 | Brooks et al. | 350/3.5 |
| 3,586,412 | 6/1971 | Leith | 350/3.5 |
| 3,708,217 | 1/1973 | McMahon | 350/3.5 |
| 3,941,450 | 3/1976 | Spitz et al. | 350/3.5 |

FOREIGN PATENT DOCUMENTS

2,041,922  3/1972  Germany ................. 350/3.5

OTHER PUBLICATIONS

Richter et al., *Applied Optics,* vol. 13, No. 12, Dec. 1974, pp. 2924-2930.

*Primary Examiner*—Ronald J. Stern
*Attorney, Agent, or Firm*—Gerald J. Ferguson, Jr.; Joseph J. Baker

[57] ABSTRACT

A hologram which is made by use of a collimated light beam incident upon the hologram at an angle with respect to the line orthogonal thereto is used as an optical element to converge a laser beam in a process of making a hologram lens. Since the hologram made by use of the obliquely incident collimated light beam has a large effective area, a hologram lens having a large effective diameter can be produced.

4 Claims, 10 Drawing Figures

METHOD OF MAKING HOLOGRAM LENSES

BACKGROUND OF THE INVENTION

1. Field of the Invention

This invention relates to a method of making a hologram lens, and more particularly to a method of making a hologram lens having a large effective diameter.

2. Description of the Prior Art

It is well known in the art that a hologram can be used as an optical element for converging a laser beam to a minute light spot as disclosed by J. M. Moran in Applied Optics, vol. 10, p. 412–415. The hologram lens is markedly thin and light in comparison with the conventional optical glass lens, and is very advantageous in that it is easily mass-produced.

In making a hologram lens which is used to form a real image, a diverging light beam and a converging light beam are used. In making a hologram lens used to form a virtual image, two diverging light beams are used. In making a hologram lens used for Fourier transformation, a collimated light beam and a converging light beam are used. Since the converging light beam and the collimated light beam are obtained by use of conventional glass lenses, the diameter of the light beam is limited by the diameter or aperture of the collimating lenses. Accordingly, a lens having a large effective diameter cannot be obtained in accordance with the prior art.

More quantitatively, the effective diameter D of a hologram lens is determined and accordingly limited by the following formula $$D = (l_2/l_1 + l_2) D_0 \quad (1)$$

where $l_1$ is the distance between the glass lens used to converge the laser beam and the hologram, $l_2$ is the distance between the hologram and the converging point, and $D_0$ is the diameter of the glass lens.

The hologram lens which is made in accordance with the above-mentioned method has a minimum length of resolution δ defined as follows:

$$\delta = 1.22 \lambda l_2/D$$

where λ is the wavelength of the laser beam. Therefore, it is desired that the effective diameter D of the hologram lens be as large as possible in order to obtain as high resolution as possible.

SUMMARY OF THE INVENTION

The primary object of the present invention is to provide a method of making a hologram lens having a large effective diameter.

Another object of the present invention is to provide a method of making a hologram lens having a large effective diameter and high resolution.

The method of making a hologram lens in accordance with the present invention is characterized in that a hologram which is made by use of a collimated light incident upon the hologram at an angle with respect to the line orthogonal thereto is used as an optical element to converge the laser beam in making a hologram lens. Since the hologram which is made by use of the obliquely incident collimated light beam has a large effective area, a hologram lens having a large effective diameter can be produced.

DESCRIPTION OF THE PREFERRED EMBODIMENTS

Figure 1A:
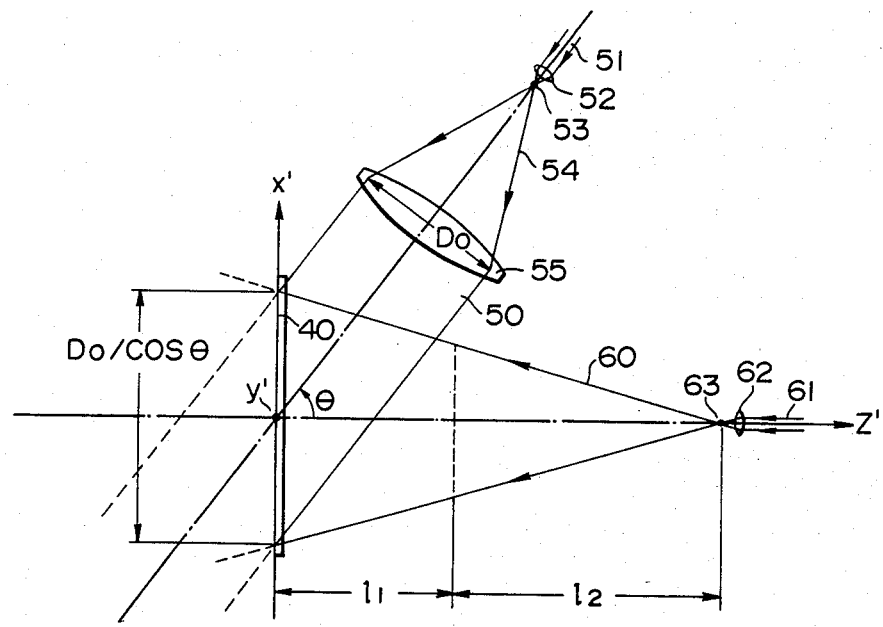
FIG. 1A is a plan view showing an optical system for recording a hologram to be used for making a hologram lens in accordance with the present invention.

In the method of making a hologram lens in accordance with the present invention, a hologram for obtaining an enlarged diameter of light beam is employed. FIG. 1A shows the optical arrangement for making the hologram. Referring to FIG. 1A, a collimated light beam 50 and a diverging light beam 60 coherent thereto are made to impinge upon a hologram recording material 40 located on the plane $x'—y'$. The collimated light beam 50 is obtained by two convex lenses 52 and 55 and a laser beam 51 emitted by a laser source. The laser beam 51 is first converged to a point light source 53 by a small convex lens 52 to obtain a diverging light beam 54 which diverges from said point light source 53. The diverging light beam 54 is collimated by a collimating convex lens 55 of comparatively large diameter. The collimated light beam 50 is incident upon the hologram recording material 40 at an incident angle θ with respect to the line orthogonal thereto (axis $Z'$). Said diverging light beam 60 is obtained by converging a laser beam 61 from a laser source by a small convex lens 62. The convex lens 62 converges the laser beam 61 to a point light source 63 so as to make it diverge therefrom. The diverging light beam 60 is incident upon the hologram recording material 40 orthogonal thereto along the axis $z'$. The small convex lenses 52 and 62 should have a short focal length.

In order that the effect of the present invention may easily be compared with the conventional method, the diameter of the large lens 55 is selected to be equal to that of said glass lens used in the conventional method, i.e. $D_0$, and the distance between the point light source 63 of the diverging light beam 60 and the hologram recording material is selected to be equal to the sum of said distances $l_1$ and $l_2$, $l_1$ being the distance between the glass lens used to converge the laser beam and the hologram and $l_2$ being the distance between the hologram and the converging point in the hologram lens making process in accordance with the conventional method.

Figure 1B:
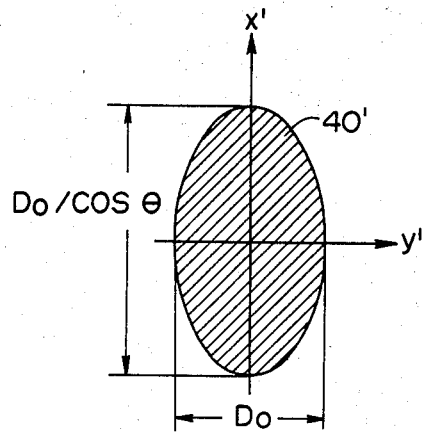
FIG. 1B is a view showing a cross section of the effective area of the hologram to be used for making the hologram lens.

The effective area of the hologram prepared as described above corresponds to the area in which the two light beams 50 and 60 are superposed on the hologram recording material 40. The diverging light beam 60 can be easily made to have a sufficiently large cross section whereas the cross section of the collimated light beam 50 is limited by the diameter of the large convex lens 55. Therefore, the effective area of the hologram recorded on the hologram recording material 40 is determined by the area which is occupied by the collimated light beam 50 on the recording material 40. FIG. 1B is a cross section of the collimated light beam 50 taken along the $x'$—$y'$ plane and corresponds to the effective area of the hologram 40' recorded on the hologram recording material 40. The cross section of the collimated light beam 50 is expanded in the direction of the $x'$-axis by $1/\cos\theta$ on the $x'$—$y'$ plane, and accordingly the diameter of the effective area of the hologram 40' formed on the hologram recording material 40 taken along the $x'$-axis is $D_0/\cos\theta$. The diameter of the effective area taken along the $y'$-axis is $D_0$. When the incident angle $\theta$ is 60°, the diameter of the effective area in the $x'$ direction becomes as large as $2D_0$.

Figure 2A:
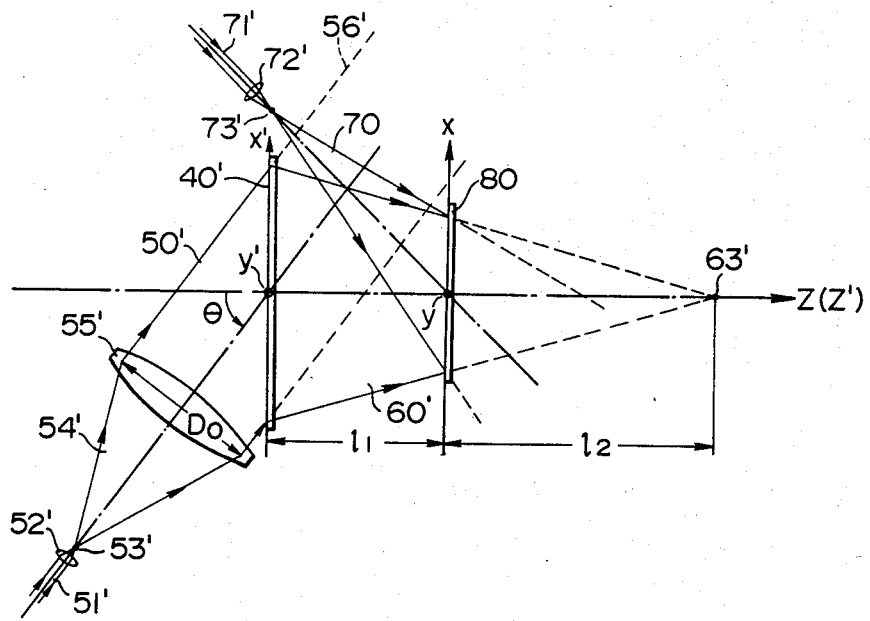
FIG. 2A is a plan view showing an optical system for making a hologram lens in accordance with an embodiment of the present invention.
Figure 2B:
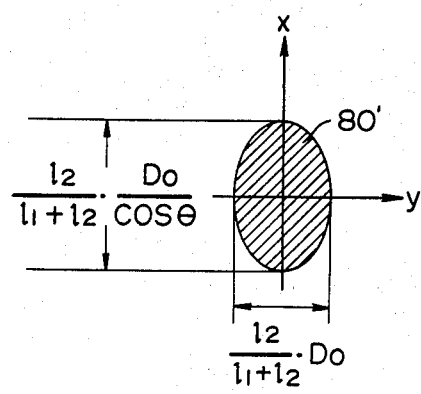
FIG. 2B is a view showing a cross section of the effective area of the hologram lens made in accordance with the present invention.

An embodiment of the present invention in which the hologram prepared in the manner as described hereinabove with reference to FIG. 1A is employed for making a hologram lens will hereinbelow be described in detail referring to FIGS. 2A and 2B. A hologram 40' prepared as described above is located on the $x'$—$y'$ plane as shown in FIG. 2A. A collimated light beam 50' conjugate with said collimated light beam 50 used for making the hologram 40' is made to impinge upon the hologram 40' at an incident angle $\theta$ equal to said incident angle $\theta$ of the collimated light beam 50 incident upon the hologram recording material 40. A first-order diffraction light beam 60' emanating from the hologram 40' forms a point image 63' on the $z'$-axis at the distance of $l_1+l_2$ from the hologram 40'. A hologram recording material 80 is located on the plane $x$—$y$ which is parallel to said $x'$—$y'$ plane and is at the distance of $l_1$ therefrom. A diverging light beam 70 coherent with said converging first-order diffraction light beam 60' is made to impinge upon the hologram recording material 80 together with the light beam 60' to record thereon an interference pattern to form a hologram lens. The diverging light beam 70 is made by once converging a laser beam 71' from a laser source by a small convex lens 72' of short focal length to form a point light source 73'. The effective area or the aperture area of the hologram lens 80' made by the method as described hereinabove is $l_2^2/(l_1+l_2)^2$ times as large as that of the hologram 40'. The diameter of the aperture or cross section of the effective area of the hologram lens 80' is $(l_2/l_1+l_2) \cdot D_0/\cos\theta$ in the direction the $x'$-axis, and $l_2/l_1+l_2 \cdot D_0$ in the direction of the $y'$-axis. The cross section of the effective area of the hologram lens 80' is shown in FIG. 2B.

The above embodiment is concerned with a method in which the effective diameter of the hologram lens is enlarged in the direction of the $x$-axis only. It is, however, possible to enlarge the diameter of the effective area of the hologram lens in both the $x$ and $y$ directions. In order to enlarge the effective diameter in both directions, the hologram for enlarging the diameter in one direction is used twice, once in $x$-direction and once in $y$-direction.

Figure 3:
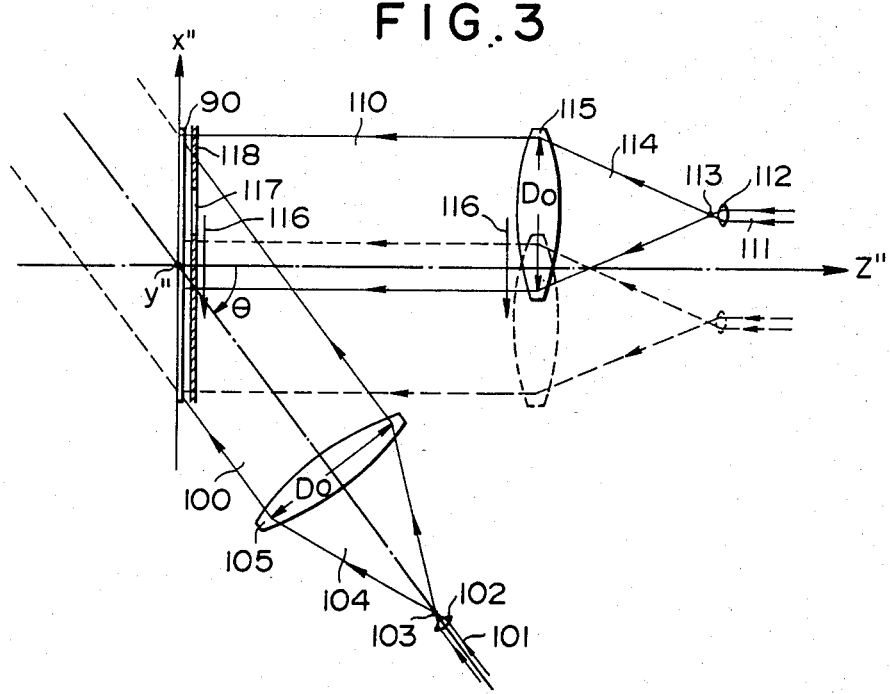
FIG. 3 is a plan view showing an optical system for recording a first hologram to be employed in a second embodiment of the invention.

A second embodiment of the present invention which makes a hologram the effective diameter of which is enlarged in both the $x$ and $y$ directions will now be described in detail with reference to FIGS. 3 to 5D. An optical arrangement for making a first hologram for enlarging the effective diameter in the $x$-direction is shown in FIG. 3. Referring to FIG. 3, a hologram recording material 90 is located on the $x''$—$y''$ plane upon which two coherent collimated light beams 100 and 110 impinge. A laser beam 101 is converged to a point light source 103 by a small convex lens 102 having a short focal length and is then diverged. The diverging light beam 104 diverging from the point light source 103 is collimated by a collimator 105 having a large diameter of $D_0$ to obtain said collimated light beam 100. A laser beam 111 is converged to a point light source 113 by a small convex lens 112 having a short focal length and is then diverged. The diverging light beam 114 diverging from the point light source 113 is collimated by a collimator 115 having a large diameter of $D_0$ to obtain said collimated light beam 110. One collimated light beam 100 is incident upon the hologram recording material 90 at an incident angle of $\theta$, and the other collimated light beam 110 is incident upon the recording material 90 orthogonally thereto along the $z''$-axis. The cross section of the obliquely impinging collimated light beam 100 is equal to said cross section of the collimated light beam 50 used in the process as shown in FIG. 1A. The cross section of the orthogonally impinging light beam 110 is circular. In order that the orthogonally impinging collimated light beam 110 may cover the cross section of the other collimated light beam 110 on the hologram recording material 90, the collimated light beam 110 is moved laterally in the direction of the $x''$-axis as indicated by an arrow 116. Together with the collimated light beam 110, a light intercepting plate 118 having an aperture 117 is also moved laterally in the same direction to superpose the light beam 110 over the other collimated light beam 110 on the recording material 90 throughout the length of the cross section thereof on the recording material 90. The movement of the light beam 110 and the light intercepting plate 118 may be intermittent or continuous. Thus, a first hologram having an effective area enlarged in the $x$-direction can be obtained. The rate of enlargement of the diameter in the $x$-direction is $l/\cos\theta$ similarly to said hologram 40'. When the hologram prepared as described above is illuminated by a collimated light beam conjugate with said collimated light beam 100, the first-order diffraction light beam emanating therefrom advances orthogonally thereto and has a diameter of $D_0/\cos\theta$ in the $x''$-direction and that of $D_0$ in the $y''$-direction.

Figure 4:
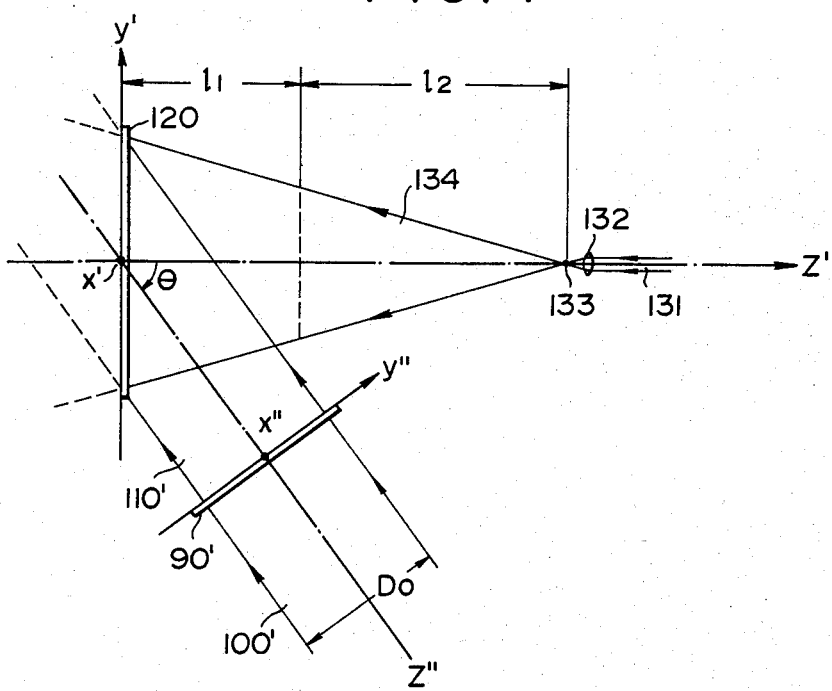
FIG. 4 is a side view showing an optical system for recording a second hologram to be employed in the second embodiment of the invention.

FIG. 4 shows an optical arrangement for making a second hologram for enlarging the effective diameter of the hologram lens in the direction of the $y$-axis by use of the first hologram. A collimated light beam 100' equivalent to said collimated light beam 100 is made to impinge upon the first hologram 90' located on the $x''$—$y''$ plane. (FIG. 4 is viewed in a direction 90° rotated from the direction in which FIG. 3 is viewed. See coordinate axes.) Consequently, a first-order diffraction light beam 110' is obtained which has a diameter of $D_0/\cos\theta$ in the $x''$-direction and of $D_0$ in the $y''$-direction. The first-order diffraction light beam 110' is made to impinge upon a hologram recording material 120 located on the $x'$—$y'$ plane at an incident angle of $\theta$ with respect to the line orthogonal thereto extending in the direction of the $z'$-axis. The cross section of the collimated light beam 110' taken along the $x'$—$y'$ plane on the hologram recording material 120 is circular and has an enlarged diameter of $D_0/\cos\theta$. Also upon the hologram recording material 120 is incident orthogonally thereto a diverging light beam 134 coherent to the light beam 110' to form an interference pattern thereon. The diverging light beam 134 is made by converging a laser beam 131 by a small convex lens 132 having a short focal length to form a point light source 133 at the focal point thereof. The point light source 133 is set to be at a distance of $l_1 + l_2$ from the hologram recording material 120. Thus, a second hologram is made. The second hologram has an effective area which is circular and has a diameter of $D_0/\cos\theta$. When the second hologram is illuminated by a light beam conjugate with said light beam 110' from the opposite direction to that of the light beam 110', a converging light beam having a cross section of the diameter of $D_0/\cos\theta$ on the second hologram and converging to a point which is at a distance of $l_1 + l_2$ from the second hologram is obtained as a first-order diffraction light beam. This first-order diffraction light beam is conjugate with said diverging light beam 134 used to make the second hologram.

Figure 5A:
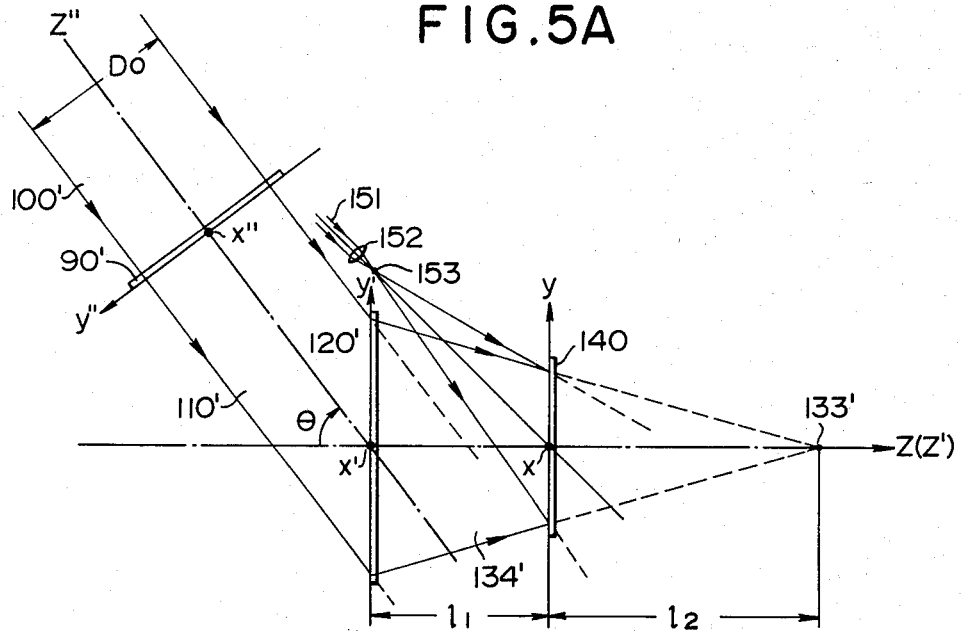
FIG. 5A is a side view showing an optical system for making a hologram lens in accordance with the second embodiment of the present invention.
Figure 5B:
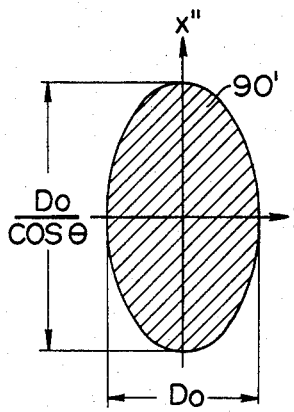
FIG. 5B is a view showing a cross section of the effective area of the first hologram.
Figure 5C:
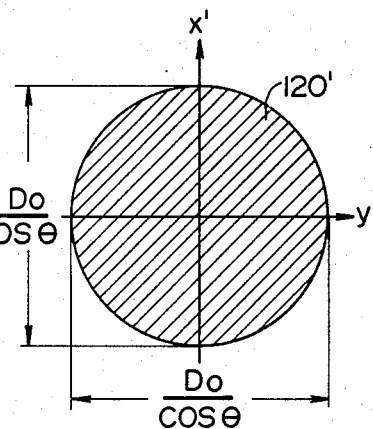
FIG. 5C is a view showing a cross section of the effective area of the second hologram.
Figure 5D:
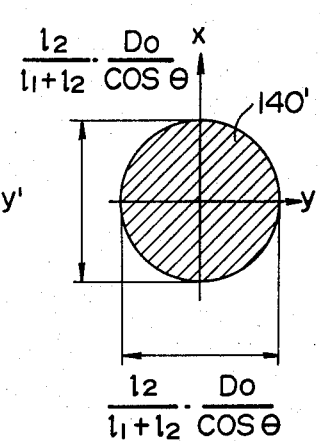
FIG. 5D is a view showing a cross section of the effective area of the hologram lens made by the method in accordance with the second embodiment of the present invention.

FIG. 5A shows an optical arrangement for making a hologram lens in accordance with the second embodiment of the present invention in which said first and second holograms 90' and 120' are used. In accordance with this embodiment, a hologram lens having an enlarged effective area which is enlarged in both the $x$ and $y$ directions can be produced. The first hologram 90' is illuminated by a collimated light beam 100' having a diameter of $D_0$ coming from a glass lens having the diameter of $D_0$. The first hologram 90' is located on the $x''$—$y''$ plane and emanates a first-order diffraction light beam 110' the cross section of which is enlarged only in the direction of the $x''$-axis. The cross section of this light beam 110' is as shown in FIG. 5B. The diffraction light beam 110' is then made to impinge upon said second hologram 120' located on the $x'$—$y'$ plane at an incident angle of $\theta$. The second hologram 120 serves to create a converging first-order diffraction light beam 134' which is conjugate with said diverging light beam 134 used to make the second hologram 120' and accordingly converges to a point 133'. The cross section of the first-order diffraction light beam 134' emanating from the second hologram 120' is circular and has a diameter of $D_0/\cos\theta$ as shown in FIG. 5C. A hologram recording material 140 is located on the $x$—$y$ plane parallel to said $x'$—$y'$ plane and separated from the $x'$—$y'$ plane by the distance of $l_1$ to receive the converging first-order diffraction light beam 134' from the second hologram 120'. Together with the converging light beam 134' is incident upon the hologram recording material 140 a diverging light beam 150. The diverging light beam 150 diverges from a point light source 153 formed by converging a laser beam 151 by a small convex lens 152 having a short focal length. The converging light beam 134' and the diverging light beam 150 are superposed on the hologram recording material 120' and an interference pattern is recorded thereon. Thus, a hologram lens is produced. The effective diameter of the hologram lens which is produced by the method as described hereinabove is $(l_1/l_1+l_2) \cdot (D_0/\cos\theta)$ and the shape thereof is as shown in FIG. 5D. Thus, in accordance with the second embodiment of the present invention, it is possible to obtain a hologram lens the effective diameter of which is enlarged in both the $x$ and $y$ directions by $l/\cos\theta$.

I claim:

1. A method of making a hologram lens comprising directing a diverging light beam at an angle to a first hologram recording material and directing a converging light beam coherent to said diverging light beam at an angle different from said angle to said first hologram recording material simultaneously with said directing of the diverging light beam characterized in that said converging light beam is formed by obliquely directing a collimated light beam at a second hologram to provide a converging first-order diffraction light beam emanating therefrom at an angle orthogonal thereto whereby the first-order diffraction light beam emanating from the hologram constitutes said converging light beam directed to said hologram recording material.

2. A method of making a hologram lens as claimed in claim 1 wherein said collimated light beam incident upon said second hologram is formed by a collimating glass lens.

3. In a method of making a hologram lens comprising the steps of directing a diverging light beam at a first angle to a first hologram recording material and directing a converging light beam coherent to said diverging light beam at a second angle different from said first angle to said first hologram recording material simultaneously with said directing of the diverging light beam, the improvement of forming said converging light beam by directing a collimated light beam at an oblique incident angle to a second hologram, said second hologram having been formed by a collimated light beam directed at said oblique incident angle thereto and a diverging light beam at an angle orthogonal thereto.

4. A method of making a hologram lens as claimed in claim 3 wherein said collimated light beam incident upon said second hologram is emanated from a third hologram, said third hologram having been formed by a collimated light beam at said oblique incident angle and a diverging light beam at an angle orthogonal thereto.

* * * * *